(12) United States Patent
Pospiech et al.

(10) Patent No.: US 9,694,984 B2
(45) Date of Patent: Jul. 4, 2017

(54) CONVEYING DEVICE

(71) Applicant: OPTIMA pharma GmbH, Schwäbisch Hall (DE)

(72) Inventors: Thomas Pospiech, Untereisesheim (DE); Gerald Thomas, Rosengarten (DE); Jürgen Rothbauer, Michelfeld (DE)

(73) Assignee: OPTIMA pharma GmbH (DE)

( * ) Notice: Subject to any disclaimer, the term of this patent is extended or adjusted under 35 U.S.C. 154(b) by 0 days.

(21) Appl. No.: 15/071,859

(22) Filed: Mar. 16, 2016

(65) Prior Publication Data

US 2016/0280466 A1 Sep. 29, 2016

(30) Foreign Application Priority Data

Mar. 25, 2015 (DE) .......................... 10 2015 205 471

(51) Int. Cl.
*B65G 47/82* (2006.01)
*B65G 25/02* (2006.01)
*B65G 25/04* (2006.01)
*B65G 15/14* (2006.01)

(52) U.S. Cl.
CPC ............. *B65G 25/02* (2013.01); *B65G 47/82* (2013.01)

(58) Field of Classification Search
CPC .......... B65G 25/04; B65G 47/82; B65G 15/14
USPC ........ 198/418, 468.01, 468.9, 602, 4, 750.26
See application file for complete search history.

(56) References Cited

U.S. PATENT DOCUMENTS 5,934,859 A 8/1999 Goetzelmann
2014/0299446 A1* 10/2014 Devaux ................ B65G 17/323
198/418

FOREIGN PATENT DOCUMENTS

EP 2 495 193 B1 9/2012

OTHER PUBLICATIONS

ProQuest Dialog Search 15071859 Complete.*
European Search Report issued in connection with EP 16 16 0423.

* cited by examiner

*Primary Examiner* — Leslie A Nicholson, III
*Assistant Examiner* — Lester Rushin
(74) *Attorney, Agent, or Firm* — Akerman LLP

(57) ABSTRACT

A conveying device for conveyed goods, comprising a conveying rake having at least one prong, and a first drive assembly which is operatively connected to the conveying rake. The conveying rake is drivable by the first drive assembly so as to perform a reciprocating movement in the conveying direction and to perform a reciprocating movement in a penetration direction. The conveying device furthermore has a mating rake having at least one prong, and a second drive assembly which is operatively connected to the mating rake. The mating rake is displaceable in the conveying direction in relation to the conveying rake, so as to clamp conveyed goods between the prong of the conveying rake and the assigned prong of the mating rake. A method for operating a conveying device for conveyed goods is also disclosed.

10 Claims, 2 Drawing Sheets

CONVEYING DEVICE

CROSS-REFERENCE TO RELATED APPLICATIONS

The present application claims priority to German Patent Application No. DE 10 2015 205 471.3, filed Mar. 25, 2015, the entirety of which is incorporated herein by reference.

FIELD OF APPLICATION AND PRIOR ART

The invention relates to a conveying device for conveyed goods, comprising a conveying rake having at least one prong, and a drive assembly which is operatively connected to the conveying rake, wherein the conveying rake by means of the drive assembly is drivable so as to perform a reciprocating movement in the conveying direction and to perform a reciprocating movement in the penetration direction. The invention furthermore relates to a method for operating a conveying device for conveyed goods.

Conveying devices are employed in plants in order to convey conveyed goods, in particular bottles, cans, ampoules, vials, and other containers to a station, for example a packing, closing, welding, filling, assembly, and/or processing station or similar, and/or in order to convey said conveyed goods away therefrom. For this purpose, so-called conveying rakes which have a receptacle region for the conveyed goods are known. By means of a conveying rake, the conveyed goods are conveyed in a cycled manner or, in particular when a plurality of interacting conveying rakes are used, in a quasi-continuous manner.

In the context of the application, movement of the conveying rake in the direction of the conveyed goods and away therefrom is referred to as a penetration movement or to movement in the penetration direction. By means of the drive assembly, the conveying rake is moved along a defined path in the conveying direction from a first position to a second position, moved from the second position in the penetration direction away from the conveyed goods to a third position, so as to release the conveyed goods, moved from the third position counter to the conveying direction to a fourth position, and moved from the fourth position in the penetration direction in the direction toward the conveyed goods to the first position.

A conveying rake is known from EP 2 495 193 B1, for example, wherein the drive assembly preferably comprises a plurality of pairs of legs which are rotatably mounted on the conveying rake, and wherein each leg pair forms a V-shaped opening out away from the conveying rake. Each of the legs of a leg pair on that side that faces away from the conveying rake is rotatably connected to a displacement member. One displacement member of a first leg and one displacement member of a second leg of a leg pair are in each case movable in a mutually independent manner by way of a dedicated drive. A reciprocating movement of the conveying rake in the conveying direction is performed by uniformly traversing the two legs of each of the leg pairs, while a reciprocating movement of the conveying rake in a penetration direction which is perpendicular to the conveying direction is generated by movement of the displacement members of a leg pair which is directed in a mutually diverging and converging manner. In order for containers which are received in the conveying rake to be securely received in clearances of the conveying rake during conveying, according to EP 2 495 193 B1 a counter retaining element for the containers, by means of which the containers in the case of movement of the conveying rake in the conveying direction remain pressed into the clearances, is disposed on that side that lies opposite the conveying rake.

It is known from DE 26 30 069 A1 to provide passive clamping springs by means of which ampoules are clamped in the clearances on the clearances of the conveying rake.

It is an object of the invention to provide a conveying device having a conveying rake, which allows reliable moving of conveyed goods of dissimilar diameters by means of a conveying rake. A further object of the invention is to provide a method for operating a conveying device.

OBJECT AND SOLUTION

These objects are achieved by the subject matter having the features of claims 1 and 5. Further advantages of the invention are derived from the dependent claims.

According to a first aspect, a conveying device for conveyed goods, comprising a conveying rake having at least one prong, and a first drive assembly which is operatively connected to the conveying rake is provided, wherein the conveying rake by means of the first drive assembly is drivable so as to perform a reciprocating movement in the conveying direction and a reciprocating movement in the penetration direction, and having a mating rake having at least one prong, and a second drive assembly which is operatively connected to the mating rake, wherein the mating rake by means of the second drive assembly in the conveying direction is displaceable in relation to the conveying rake, so as to clamp conveyed goods between the at least one prong of the conveying rake and the prong of the mating rake assigned thereto.

The conveyed goods are clamped by movement of the mating rake in the conveyed direction in relation to the conveying rake, wherein an opening dimension, an adjustment path, and a clamping force are adjustable by way of selection of the relative movement. In the case of collective movement, conveying in the conveying direction results.

The conveying rake and the mating rake are preferably oriented in an identical manner, i.e. free ends of the prongs of the conveying rake and of the mating rake preferably point in the same direction, such that the conveyed goods are introducible from the conveying plane into the receptacle regions without a movement out of a conveying plane. For this purpose, the conveying rake and the mating rake are disposed so as to be at least partially offset in a direction perpendicular to the conveying plane. The penetration direction is suitably selectable, depending on the type of application. In advantageous embodiments, a penetration movement is performed in a transverse manner, in particular so as to be perpendicular to the conveying direction in a conveying plane.

The conveying rake and the mating rake in each case preferably have a plurality of prongs, wherein conveyed goods may be clamped in each case between one prong of the conveying rake and one prong of the mating rake. Furthermore preferably, two prongs of the conveying rake delimit receptacle regions, wherein in one prong of the mating rake is positioned in each receptacle region or in part of the receptacle regions. In this case, it is provided in one embodiment that the prongs of the conveying rake or of the mating rake protrude from an associated main body in a direction which is perpendicular to the conveying plane, and that the prongs are disposed so as to be mutually meshing. In other design embodiments, the prongs grip the conveyed goods at dissimilar heights in a direction perpendicular to the conveying plane. Positioning in a receptacle region in the context of the application thus also includes a positioning in which the prongs are positioned at dissimilar heights perpendicular to the conveying direction but in a plan view onto the conveying plane the prongs of the mating rake are positioned in the receptacle region.

In one embodiment, the conveying rake and the mating rake are intercoupled so as to be displaceable in relation to one another in the conveying direction. Relative movement in other directions in this case is preferably blocked, such that the mating rake serves as a guide installation for the conveying rake and vice versa. Hence, in case the mating rake is held in a stationary manner, movement of the conveying rake is only possible in or counter to the conveying direction. Minimal play movements for the compensation of tolerances are possible here also in other directions. Likewise, in case the conveying rake is held in a stationary manner, movement of the mating rake is only possible in or counter to the conveying direction. For a movement in the penetration direction, the conveying rake and the mating rake are thus to be driven in a synchronous manner. In other design embodiments, relative movement in directions which are transverse to the conveying direction is likewise possible such that the conveying rake and the mating rake may also carry out relative movements in the penetration direction.

In one embodiment, the drive assemblies of the conveying rake and of the mating rake are mechanically decoupled, wherein the drive assemblies are in each case designed in a manner known for example from EP 2 495 193 B1 and perform a temporally offset movement.

In advantageous embodiments, the drive assemblies of the conveying rake and of the mating rake interact, wherein the conveying rake and the mating rake by means of the first and of the second drive assembly are drivable to perform a reciprocating movement in the conveying direction in a synchronous manner or with a temporal offset. By way of a suitable selection of the temporal offset it is possible for a person skilled in the art to adapt a gripping or clamping movement to any conveyed goods The first drive assembly and/or the second drive assembly in one embodiment have in each case at least two intercoupled members which are in each case pivotable about an axis which is perpendicular to the conveying plane, and two drives which are assigned to the members. In other words, the drive assembly is constructed in the manner of a SCARA robot, such that positioning of a distal end of the second member is in each case possible in a conveying plane. The members are implementable as levers or arms or by means of cam disks. The distal end is coupled to the conveying rake or to the mating rake, respectively. The distal ends in this case are preferably coupled to the conveying rake or the to the mating rake, respectively, in pivotable manner, and the conveying rake and the mating rake are intercoupled so as to be displaceable with one degree of freedom.

In order to enable additional movement, the first drive assembly and the second drive assembly in one embodiment additionally have in each case one third drive by means of which the conveying rake and the mating rake are collectively adjustable in a direction perpendicular to the conveying plane. Here, adjustment in a manner perpendicular to the conveying plane is possible while the conveyed goods are clamped between the conveying rake and the mating rake. On account thereof, a flexibility of an associated plant can be further increased.

According to a second aspect, a method for operating a conveying device for conveyed goods is provided, wherein the conveying device has a conveying rake having at least one receptacle region for the conveyed goods delimited by two prongs, a first drive assembly which is operatively connected to the conveying rake, a mating rake having at least one prong, and a second drive assembly which is operatively connected to the mating rake, wherein the at least one prong of the mating rake is positioned in a receptacle region of the conveying rake, the conveying rake by means of the first drive assembly is driven to perform a reciprocating movement in the conveying direction and to perform a reciprocating movement in the penetration direction, and the mating rake by means of the second drive assembly is adjusted in relation to the conveying direction, so as to clamp conveyed goods by means of the assigned prong of the mating rake. A drive of the conveying rake and of the mating rake is implementable by means of suitable drive assemblies.

Preferably, the conveying rake and the mating rake are intercoupled so as to be displaceable in relation to one another in the conveying direction.

In one advantageous design embodiment, it is provided that the conveying rake and the mating rake by means of the first and of the second drive assemblies are driven to perform a reciprocating movement in the conveying direction in a synchronous manner with a temporal offset. Here, no clamping takes place in the case of a synchronous movement.

In particular, it is preferably provided that the conveying rake and the mating rake by means of the first and of the second drive assemblies are driven such that the conveying rake and the mating rake are in each case moved with a temporal offset in the conveying direction from a first position to a second position, moved in a synchronous manner in the penetration direction from the second position away from the conveyed goods to a third position, moved in a synchronous manner counter to the conveying direction from the third position to a fourth position, and moved in a synchronous manner in the penetration direction onto conveyed goods and to the first position. The movement may be started or terminated at any position or between the positions. Preferably, the movement is carried out repeatedly. A penetration movement in known embodiments is performed in a manner perpendicular to the conveying direction in a conveying plane. Alternatively, a penetration movement is performed along a curved path by way of rotation about an axis which is parallel to the conveying direction.

Movement of this type is implementable by way of suitable drive assemblies. In particular, it is provided in advantageous design embodiments that the first drive assembly and/or the second drive assembly have in each case at least two intercoupled members which are in each case pivotable about an axis which is perpendicular to the conveying plane, and two drives which are assigned to the members, wherein the drives are actuated so as to pivot the members of the first drive assembly and of the second drive assembly in a synchronous or temporally offset manner. In particular, it is possible here for the members of the first drive assembly to be pivoted in such a manner that a distal end of the second member of the first drive assembly is adjusted in the conveying direction. The distal end is coupled to the conveying rake. Moreover, the conveying rake is displaceably connected to the mating rake and is guided by the latter. On account thereof, it is possible for the conveying rake to be displaced in the conveying direction by way of a pivoting movement of the members of the first drive assembly.

BRIEF DESCRIPTION OF THE DRAWINGS

Further advantages and aspects of the invention may be derived from the claims and from the following description of a preferred exemplary embodiment of the invention, which will be set forth hereunder with reference to the figures in which:

DETAILED DESCRIPTION OF THE EXEMPLARY EMBODIMENTS

Figure 1:
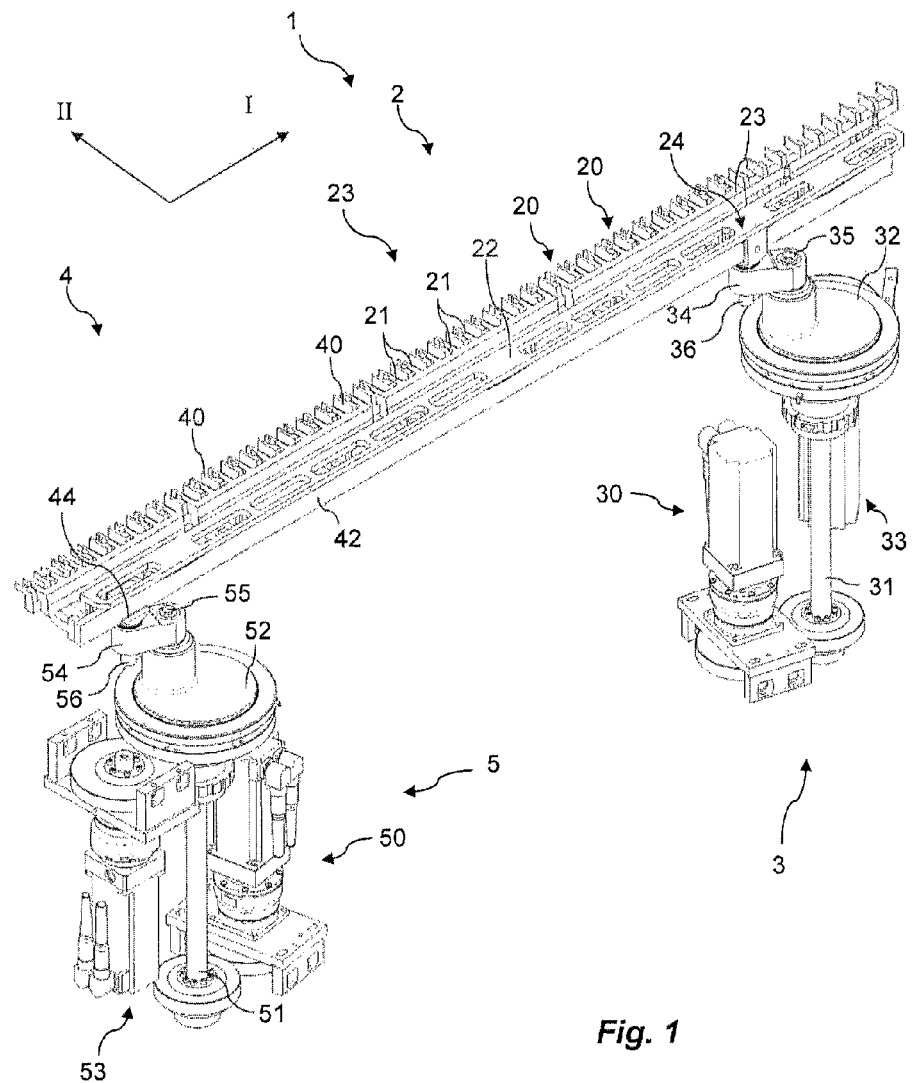
FIG. 1 shows an embodiment of the conveying device in a perspective illustration.
Figure 2:
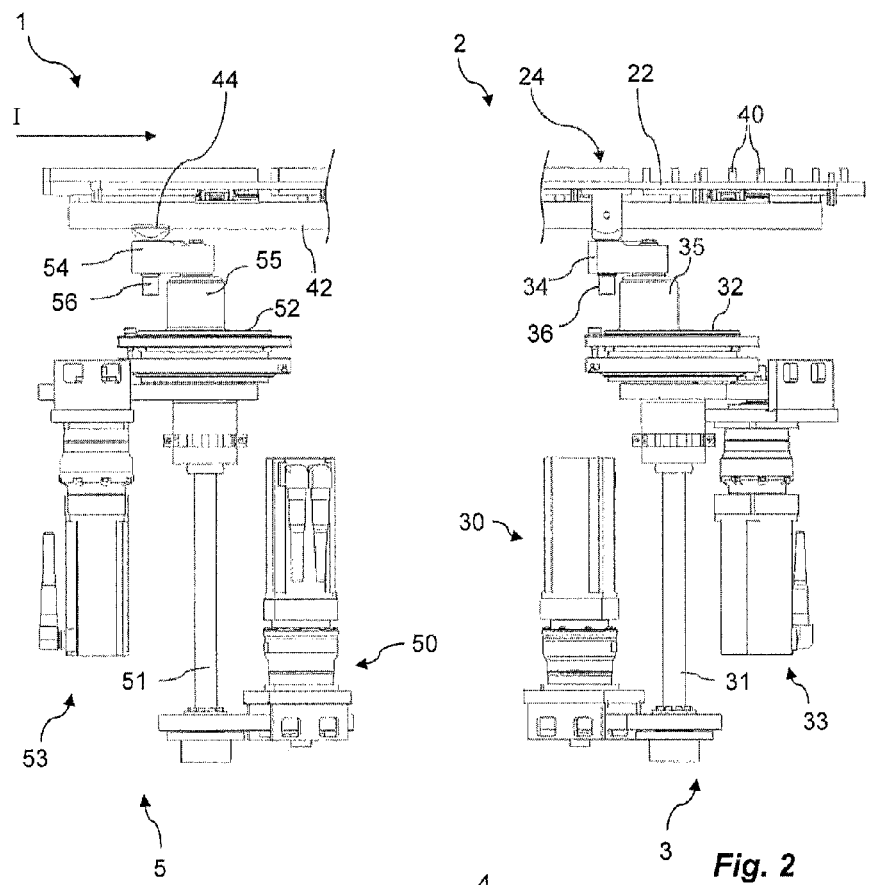
FIG. 2 shows the conveying device according to FIG. 1 in a side view.
Figure 3:
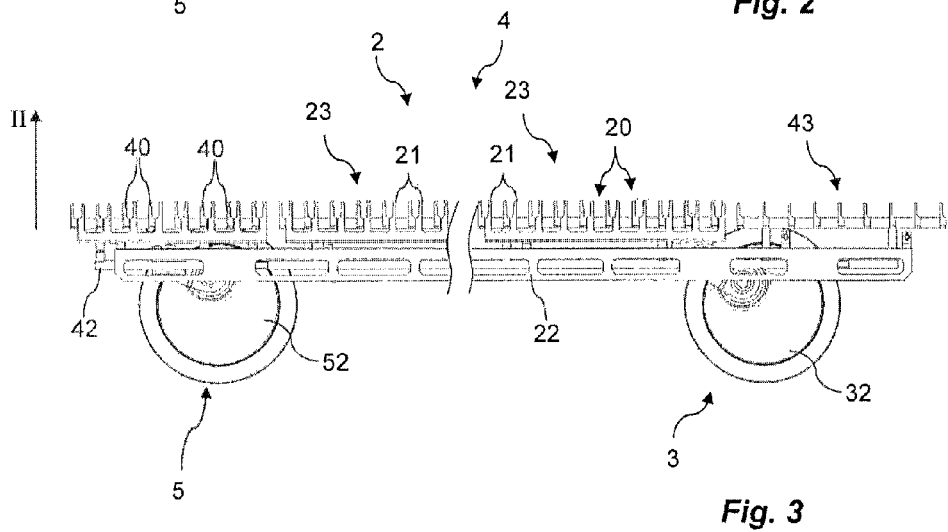
FIG. 3 shows the conveying device according to FIG. 1 in a plan view.

FIGS. 1 to 3 schematically show a conveying device 1 for conveyed goods, in a perspective illustration, in a side view, and in a plan view, respectively.

The conveying device 1 comprises a conveying rake 2 having a plurality of receptacle-regions 20 defining prongs 21 for the conveyed goods (not illustrated). The illustrated conveying rake 2 comprises a rail 22 on which a plurality of main bodies 23 (four main bodies 23, in the illustrated embodiment) which have the prongs 21 are arranged fixed in position. On account of the design having a plurality of main bodies 23, simple construction is possible, wherein dissimilar lengths of the conveying rake may be implemented by a suitable selection of a rail 22.

The conveying device 1 furthermore comprises a drive assembly 3 which is operatively connected to the conveying rake 2. The conveying rake 2 by means of the drive assembly 3 is drivable so as to perform a reciprocating movement in a conveying direction I and to perform a reciprocating movement in a penetration direction II. In the illustrated exemplary embodiment, the penetration direction is transverse, in particular perpendicular, to the conveying direction I in a conveying plane of the conveying rake 2.

The illustrated drive assembly 3 is of a construction similar to that of a SCARA robot. The drive assembly comprises a first drive 30 by means of which a cam disk 32 which is arranged on a shaft 31 is drivable so as to perform a pivoting movement about the longitudinal axis of the shaft 31. The drive assembly 3 furthermore comprises a second drive 33 by means of which a lever 34 which is arranged on the cam disk 32 is pivotable about a shank 35, which shank 35 is arranged on the cam disk 32 so as to be eccentric to the shaft 31. The conveying rake 2 by means of a connection pin 36 which is rotatably mounted on the lever 34 is fastened to an end of the lever 34 which faces away from the cam disk 32. By means of suitable actuation of the drives 30, 33, a fitting region 24 of the conveying rake 2, at which the connection pin 36 engages, is movable along a desired path in the conveying plane. Actuation is preferably performed in such a manner that the fitting region 24 is moved in a rectangular path from a first position in the conveying direction I to a second position, from the second position in the penetration direction II away from the conveyed goods, in order for said conveyed goods to be released, to a third position, from the third position counter to the conveying direction I to a fourth position, and from the fourth position in the penetration direction II in the direction of the conveyed goods to the first position. In order to provide reliable moving of the conveyed goods, the portions of movement are preferably linear.

The drives 30, 33 are designed as electric motors, in particular as servo motors. Motors of this type allow for simple actuation capability. However, it is also conceivable for pneumatic or hydraulic drives to be provided.

The conveying device 1 furthermore comprises a mating rake 4 which is coupled to the conveying rake 2 so as to be displaceable in relation to the conveying rake 2 in the conveying direction I. The mating rake 4 has a multiplicity of prongs 40 which are in each case disposed in a receptacle region 20 and interact with a prong 21 of the conveying rake 2. By moving the mating rake 4 in relation to the conveying rake 2 in the conveying direction I, the prongs 40 are in each case moved in the direction of a prong 21 of the conveying rake 2, which delimits the associated receptacle region 20, or are moved away therefrom, respectively. On account thereof, conveyed goods, in particular even a small container, such as an ampoule or a vial, may be gripped between the prong 40 of the mating rake 4 and the associated prong 21 of the conveying rake 2. The interacting prongs 40, 21 in the illustrated exemplary embodiment have gripping faces. The gripping faces in advantageous design embodiments are adapted to the conveyed goods.

In the illustrated exemplary embodiment, the mating rake 4 is disposed below the conveying rake 2. Hence, the mating rake 4 is disposed so as to be offset in relation to the conveying rake 2 in a direction perpendicular to a plane defined by the conveying direction I and the penetration direction II. The mating rake 4 likewise comprises a rail 42 on which a plurality of main bodies 43 having the prongs 40 are attached in a locationally fixed manner. The prongs 40 protrude from the main body 43 and are suitably shaped, such that the prongs 40 of the mating rake 4 and the prongs 21 of the conveying rake clamp conveyed goods in a corresponding region. On account thereof, tilting of the conveyed goods due to the influence of clamping forces is avoided.

The mating rake 4 by means of a drive assembly 5 is drivable so as to perform a reciprocating movement which is transverse to the conveying direction I and in a penetration direction II.

The construction of the illustrated drive assembly 5 corresponds to the construction of the drive assembly 3. The drive assembly 5 likewise comprises a first drive 50 by means of which a cam disk 52 which is arranged on a shaft 51 is drivable so as to perform a pivoting movement about the longitudinal axis of the shaft 51. The drive assembly 5 furthermore comprises a second drive 53 by means of which a lever 54 which is arranged on the cam disk 52 is pivotable about a shank 55, which shank 55 is arranged on the cam disk 52 so as to be eccentric to the shaft 51. The mating rake 4 by means of a connection pin 56 which is rotatably mounted on the lever 54 is fastened to an end of the lever 54 which faces away from the cam disk 52. By means of suitable actuation of the drives 50, 53, a fitting region 44 of the mating rake 4, at which the connection pin 56 engages, is movable along a desired path in the conveying plane.

Actuation is preferably performed in such a manner that the fitting region 44 is likewise moved along a rectangular path, wherein the fitting region 44 and thus the mating rake 4 commence a movement in and counter to the conveying direction I with a temporal offset to the fitting region 24 of the conveying rake. In other words, the drives 30, 33, 50, and 53 of the drive assemblies 3, 5 are initially actuated in such a manner that the fitting regions 24, 44 and thus the conveying rake 2 and the mating rake 4 are in each case moved with a temporal offset from a first position in the conveying direction I to a second position.

Actuation is preferably performed in such a manner that the movement of the mating rake 4 commences prior to the movement of the conveying rake 2, such that the prongs 40 are moved in the direction of the associated prongs 21 and conveyed goods are gripped, and such that the movement of the mating rake 4 terminates prior to the movement of the conveying rake 2, such that the prongs 21 are moved away from the prongs 40 of the mating rake 4 and conveyed goods are thus released. On account of the selection of a temporal offset, adaptation of a gripping width is possible. Once the conveying rake 2 and the mating rake 4 have in each case reached the second position, actuation is possible in such a manner that the conveying rake 2 and the mating rake 4 are collectively moved from the second position in the penetration direction II away from the conveyed goods to a third position, collectively moved from the third position counter to the conveying direction I to a fourth position, and collectively moved from the fourth position in the penetration direction II in the direction of the conveyed goods to the first position. Alternatively, it is conceivable for the movements from the second position to the third position, from the third position to the fourth position, and/or from the fourth position to the first position to be likewise carried out with a temporal offset.

The illustrated drive assemblies 3, 5 enable reliable and precise control of movement, the number of elements required therefor being minimized. However, other drive assemblies which allow temporally offset movement of the conveying rake 2 and of the mating rake 4 for gripping or releasing conveyed goods, respectively, between the associated prongs 21, 40 are conceivable.

In one refinement, the drive assemblies 3, 5 comprise in each case a third drive by means of which the conveying rake 2 and the mating rake 4 are adjustable in a direction which is perpendicular to the conveying plane. The third drive here in one design embodiment is upstream of the first drive 30, 50, such that the first and second drives having the conveying rake and the mating rake, respectively, are adjusted. In other design embodiments, the third drive is disposed such that the conveying rake and the mating rake are adjusted in relation to the first drives 30, 50 and to the second drives 33, 53, respectively.

In one alternative design embodiment, it is provided that the conveying rake 2 is driven by means of the drive assembly 3 and is guided in movement by means of a suitable guide installation, wherein the mating rake 2 is mounted on the conveying rake 2 and by means of a drive assembly which is likewise disposed on the conveying rake 2 is adjusted in relation to the conveying rake 2, in order for the conveyed goods to be gripped.

In yet one other design embodiment, a penetration movement is performed by rotating the conveying rake 2 about an axis which is parallel to the conveying direction I and/or by a movement which is perpendicular to the conveying plane of the conveying rake 2.

The invention claimed is:
1. A conveying device for conveyed goods, comprising:
a conveying rake having prongs, and
a first drive assembly which is operatively connected to the conveying rake, wherein the conveying rake is drivable by means of the first drive assembly so as to perform a reciprocating movement in a conveying direction and a reciprocating movement in a penetration direction; and
a mating rake having prongs, and a second drive assembly which is operatively connected to the mating rake, wherein the mating rake is drivable by means of the second drive assembly so as to perform a reciprocating movement in the conveying direction,
wherein:
the conveying rake is drivable by means of the first drive assembly so as to move in the conveying direction from a first position to a second position,
the mating rake is drivable by means of the second drive assembly so as to move in the conveying direction from a third position to a fourth position, such that the mating rake is displaceable in the conveying direction in relation to the conveying rake, so as to clamp conveyed goods between the prongs of the conveying rake and the prongs of the mating rake, and
the mating rake is displaceable by means of the second drive assembly in the conveying direction for a collective movement with the conveying rake for conveying the conveyed goods in the conveying direction.

2. The conveying device as claimed in claim 1, wherein the conveying rake and the mating rake are intercoupled so as to be displaceable in relation to one another in the conveying direction.

3. The conveying device as claimed in claim 1, wherein the conveying rake and the mating rake by means of the first drive assembly and of the second drive assembly are drivable in a synchronous manner or with a temporal offset so as to perform a reciprocating movement in the conveying direction.

4. The conveying device as claimed in claim 1, wherein the first drive assembly and the second drive assembly have in each case at least two intercoupled members which are in each case pivotable about an axis which is perpendicular to the conveying plane, and two drives which are assigned to the members.

5. The conveying device as claimed in claim 4, wherein the first drive assembly and the second drive assembly have in each case one third drive by means of which the conveying rake and the mating rake are collectively adjustable in a direction perpendicular to the conveying plane.

6. A method for operating a conveying device for conveyed goods, wherein the conveying device has a conveying rake having prongs, a first drive assembly which is operatively connected to the conveying rake, a mating rake having prongs, and a second drive assembly which is operatively connected to the mating rake, wherein
the conveying rake by means of the first drive assembly is driven to perform a reciprocating movement in a conveying direction and to perform a reciprocating movement in a penetration direction,
the mating rake by means of the second drive assembly is driven to perform a reciprocating movement in the conveying direction,
the conveying rake by means of the first drive assembly is driven to move in the conveying direction from a first position to a second position, and
the mating rake by means of the second drive assembly is drivable so as to move in the conveying direction from a third position to a forth position, such that:
the mating rake by means of the second drive assembly is moved in the conveying direction in relation to the conveying rake, so as to clamp conveyed goods between the prongs of the conveying rake and the prongs of the mating rake; and
the mating rake by means of the second drive assembly in the conveying direction is collectively moved with the conveying rake for conveying the conveyed goods in the conveying direction.

7. The method as claimed in claim 6, wherein the conveying rake and the mating rake are intercoupled so as to be displaceable in relation to each other in the conveying direction.

8. The method as claimed in claim 6, wherein the conveying rake and the mating rake by means of the first drive assembly and of the second drive assembly are driven in a synchronous manner or with a temporal offset so as to perform a reciprocating movement in the conveying direction.

9. The method as claimed in claim 8, wherein the conveying rake and the mating rake by means of the first drive assembly and of the second drive assembly are driven such that the conveying rake and the mating rake are in each case moved with a temporal offset in the conveying direction from a first position to a second position, moved in a synchronous manner in the penetration direction from the second position away from the conveyed goods to a third position, moved in a synchronous manner counter to the conveying direction from the third position to a fourth position, and moved in a synchronous manner in the penetration direction onto conveyed goods and to the first position.

10. The method as claimed in claim 1, wherein the first drive assembly and the second drive assembly have in each case at least two intercoupled members which are in each case pivotable about an axis which is perpendicular to the conveying plane, and two drives which are assigned to the members, wherein the drives are actuated so as to pivot the members of the first drive assembly and of the second drive assembly in a synchronous manner or with a temporal offset.

* * * * *